US010237781B2

(12) United States Patent
Qian et al.

(10) Patent No.: US 10,237,781 B2
(45) Date of Patent: Mar. 19, 2019

(54) CHANNEL QUALITY ESTIMATION FOR LINK ADAPTATION WITHIN INTERFERENCE LIMITED SYSTEMS

(71) Applicants: ZTE Corporation, Shenzhen (CN); ZTE Canada Inc., Toronto (CA)

(72) Inventors: Xing Qian, Conestogo (CA); Yu Chen, Shenzhen (CN)

(73) Assignees: ZTE Corporation, Shenzhen (CN); ZTE Canada Inc., Toronto (CA)

( * ) Notice: Subject to any disclaimer, the term of this patent is extended or adjusted under 35 U.S.C. 154(b) by 0 days.

(21) Appl. No.: 15/436,312

(22) Filed: Feb. 17, 2017

(65) Prior Publication Data

US 2017/0245173 A1 Aug. 24, 2017

(30) Foreign Application Priority Data

Feb. 19, 2016 (WO) ................ PCT/CN2016/074110

(51) Int. Cl.

| H04L 25/03 | (2006.01) |
|---|---|
| H04L 27/26 | (2006.01) |
| H04W 28/04 | (2009.01) |
| H04L 1/00 | (2006.01) |
| H04L 25/02 | (2006.01) |
| H04J 11/00 | (2006.01) |
| H04L 27/00 | (2006.01) |
| H04L 5/00 | (2006.01) |

(52) U.S. Cl.
CPC ........... *H04W 28/04* (2013.01); *H04J 11/004* (2013.01); *H04L 1/0038* (2013.01); *H04L 1/0054* (2013.01); *H04L 25/0202* (2013.01); *H04L 25/0204* (2013.01); *H04L 25/03993* (2013.01); *H04L 27/2649* (2013.01); *H04L 1/0003* (2013.01); *H04L 1/0026* (2013.01); *H04L 5/0062* (2013.01); *H04L 27/0012* (2013.01)

(58) Field of Classification Search
CPC .......... H04L 25/0202; H04L 25/03993; H04L 1/0038; H04L 1/0054; H04L 25/0204; H04L 25/2649; H04J 11/004; H04W 28/04

See application file for complete search history.

(56) References Cited

U.S. PATENT DOCUMENTS

| 2004/0192215 A1* | 9/2004 | Onggosanusi | ...... H04L 25/0202 455/67.13 |
|---|---|---|---|
| 2009/0291699 A1* | 11/2009 | Heath | ................. H04B 7/022 455/501 |
| 2012/0082274 A1* | 4/2012 | Bury | ................. H04L 25/0202 375/346 |
| 2013/0114659 A1* | 5/2013 | Murakami | .......... H04L 27/2691 375/224 |

(Continued)

*Primary Examiner* — David B Lugo
(74) *Attorney, Agent, or Firm* — Perkins Coie LLP

(57) ABSTRACT

To process received wireless signals received in a receiver, a noise and interference estimate is generated by subtracting the serving cell component from the received OFDM signal, a normalized noise signal is produced by whitening the noise and interference estimate, interference information is detected from the normalized noise signal associated with corresponding reliability information indicating reliability of the interference information, interference cancellation is performed based on the interference information, and a performance indicator indicative of an accuracy of the interference cancellation is adaptively adjusted using the reliability information.

30 Claims, 5 Drawing Sheets

(56) References Cited

U.S. PATENT DOCUMENTS

| | | | |
|---|---|---|---|
| 2014/0153625 A1 | 6/2014 | Vojcic et al. | |
| 2015/0131758 A1* | 5/2015 | Chen | H04B 1/1027 375/340 |
| 2015/0215700 A1 | 7/2015 | Sun et al. | |
| 2015/0289280 A1* | 10/2015 | Davydov | H04W 72/12 370/252 |
| 2016/0156430 A1* | 6/2016 | Madan | H04L 1/0015 370/328 |
| 2017/0085401 A1* | 3/2017 | Qian | H04L 43/16 |

\* cited by examiner

CHANNEL QUALITY ESTIMATION FOR LINK ADAPTATION WITHIN INTERFERENCE LIMITED SYSTEMS

CROSS REFERENCE TO RELATED APPLICATIONS

This patent document claims the benefit of priority under 35 U.S.C. § 119(a) and the Paris Convention of International Patent Application No. PCT/CN2016/074110, filed on Feb. 19, 2016. The entire content of the before-mentioned patent application is incorporated by reference as part of the disclosure of this patent document.

BACKGROUND

This patent document relates to channel quality estimation, and more specifically for estimating channel quality for link adaptation with network-assisted interference cancellation.

As the number of wireless user devices increases, so does the use of spectrum for wireless transmissions. Often, signals from multiple communication networks are receivable at locations, especially densely populated areas and public places. Many traditional data reception techniques are not adequately able to handle situations where interferences from other neighboring devices and networks may degrade the quality of a desired signal being received.

SUMMARY

This patent document describes technologies, among other things, for processing received wireless signals using blind detection for interference information and adjusting Signal to Interference and Noise Ratio (SINR) with metrics obtained from the blind detection to increase the precision of effective channel quality estimation for link adaptation.

In one example aspect, a physical abstraction model for system level simulation and link adaptation technique, relying on the blind detection reliability metrics of interfering signal, for LTE/LTE-A systems using non-iterative Network Assisted Interference Cancellation and Suppression (NA-ICS) receiver with interference cancellation capability is disclosed.

In another example aspect, an approximate post-processing Signal to Interference and Noise Ratio (SINR) calculation for Maximum Likelihood Detector (MLD) by using post-MMSE SINR value plus adaptive gain factor is disclosed for interference cancellation in interference limited systems.

In another example aspect, techniques are disclosed for processing received wireless signals in a receiver in which an OFDM signal is received, a noise and interference estimate is generated by subtracting the component from the received OFDM signal, a normalized noise signal is produced by whitening the noise and interference estimate, interference information is detected from the normalized noise signal associated with corresponding reliability information indicating reliability of the interference information, interference cancellation is performed based on the interference information, and a performance indicator indicative of an accuracy of the interference cancellation is adaptively adjusted using the reliability information.

Details of the above aspects and their implementations are set forth in the accompanying drawings, the description and the claims.

DETAILED DESCRIPTION

Figure 1:
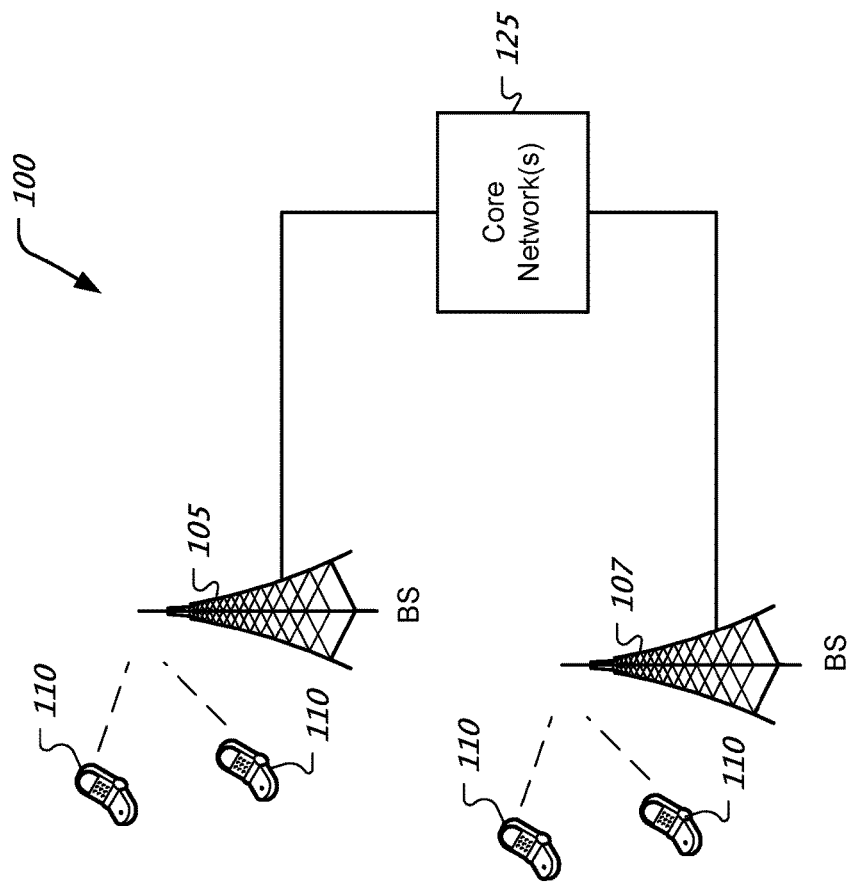
FIG. 1 shows an example of a wireless communication system.

In this document, section headers are used for ease of understanding and do not limit the use of disclosed technology to such sections.

A physical layer abstraction method is disclosed for the link abstraction model in system level evaluation and the link adaption application in a practical interference limited system for receiver with interference cancellation capability. For LTE/LTE-A system with sophisticated techniques, the system level evaluations are necessary to be performed before its deployment. Such evaluations normally require intensive computations with extremely long execution time because of the complexity of advanced receiver algorithm, the characterization of the radio links between each User Equipment (UE) and Evolved Node B (eNodeB), and iterative regression testing for all possible radio link scenarios. It is indispensable to have an accurate and effective physical layer abstraction model which replaces the actual link level computations and provides the higher layers with necessary and accurate link quality metrics. For a practical system, Link Adaptation (LA) is a crucial procedure to achieve the theoretical performance of system throughput. LA is based on Channel Quality Information (CQI) report which may be in the form of quantized Signal to Interference and Noise Ratio (SINR). However, an intrinsic problem of LA is the inaccuracy of CQI especially in some interference limited scenarios. The Modulation and Coding Schemes (MCSs) are frequently overestimated or underestimated, inevitably leading to a very high Block Error Rate (BLER) or a rather low spectral efficiency.

One issue of the problem is how to accurately and effectively characterize the effective SINR under interference limited system with non-linear advanced receiver. In addition, LTE/LTE-A is designed for frequency reuse where all the cells use the same frequency. Such design causes a challenge of high inter-cell interference. When a UE is located between two cells, different users might be scheduled in nearby cells from one transmission time interval to another, often causing completely different levels of interference. Consequently, high levels of interference, low SINR, and poor receiver performance can be expected near the cell-edge. The unstable behavior of the interference generally has a negative impact on the implementation and performance of fast LA schemes.

In LTE-A Release 12, Network Assisted Interference Cancellation and Suppression (NACIS) receiver, including Symbol-Level Interference Cancellation (SLIC), Reduced-Maximum Likelihood (R-ML) receiver, are proposed to combat the interference as least partially based on the knowledge of interferer's information. With full knowledge of interference, link-level simulation shows that NAICS could give significant performance improvements. The availability and accuracy of interferer's knowledge determine applicable algorithms, use of interference cancellation or interference suppression, and final achievable system performance of an NAICS receiver. A physical layer abstraction method based on the reliability metrics of interferer's parameter from blind detection is disclosed herein to be used in the instantaneous adaptive gain factor estimation in the post-processing SINR calculation for Maximum Likelihood Detector (MLD) in interference limited systems, where gain factor represents the receiver performance improvement due to interference cancellation.

In some embodiments, the estimated post-processing SINR includes the factor of achievable degree of interference cancellation. The complexity of link abstraction could be reduced and the accuracy of CQI estimation could be increased considerably. The physical layer abstraction method outperforms models relying only on the interference-to-signal ration (ISR) from the fact that the performance of NAICS is affected by a combination of several parameters, such as SNR of desired signal, INR of strongest interferer, other residual interferers, modulation scheme, and transmission modes of both serving cell and interference cell. There are no simple and monotonous relationships with any single parameter.

Wireless data service requirement has been growing tremendously in recent years due to new generations of wireless gadgets, e.g., smartphones and tablets, as well as fundamental evolution of applications from being voice and data-centric to multimedia-centric. This continuing tendency requires increasing network capacity in all dimensions: efficiency, spectrum, and density. The radio spectrum is a scarce resource that should be utilized as spectrally efficient as possible. In order to achieve this goal, frequency reuse technique to improve capacity and spectral efficiency is proposed by reusing frequencies and channels within a communication system. LTE-A system uses frequency-reuse, meaning that whole available frequency band is reused by every eNodeB in the network. In practice, using the same frequency band in neighboring cells causes high levels of inter-cell interference especially at cell edges. Consequently, high levels of interference, low SINR, and poor receiver performance can be expected near the cell-edge. Most of the recent wireless systems are interference limited rather than noise limited. LTE/LTE-A system uses universal frequency reuse without soft handoff, and interference is a fundamental issue. Understanding and mitigating interference is useful to the performance improvement for deploying wireless networks. In order to improve the performance of the edge UEs and system performance, enhanced inter-cell interference coordination in heterogeneous networks is proposed in LTE. At same time, advanced co-channel interference award signal detection techniques have drawn research during the recent development of LTE-A systems, especially, NAICS is currently being proposed in LTE-A Release 12.

In order to realize the actual performance improvements in LTE-A systems, it is essential to incorporate the performance gain from employing the NAICS receiver into adaptive transmission techniques such as LA. LA is based on CQI report which is usually in the form of quantized SINR. CQI plays a key role in the LA process, and more accurate CQI measurement at UE side gives more throughput gain. However, an intrinsic problem of LA is the inaccuracy of CQI especially in interference limited systems. One problem is how to accurately and effectively characterize the effective SINR for a non-linear advanced receiver, such as an NAICS receiver. In addition, the unstable behavior of the interference generally has a negative impact on the implementation and performance of fast LA schemes.

Non-linear MLD-based demodulator has been applied widely as an improvement over linear MMSE demodulator. MLD and its reduced complexity extensions are promising receiver technologies for MIMO-OFDM Spatial Multiplex (SM) systems to fully achieve its potential capacity. The MLD demodulator calculates the squared-error metric between the received signal and the product of the matrix channel and all hypotheses of the MIMO symbols, wherein each hypothesis minimizes the squared error gives the Maximum Likelihood (ML) estimate of the transmitted signal. Soft bit information can be calculated by taking the difference of squared-distance metrics between the ML MIMO symbol estimates and MIMO symbols with bits flipped from the ML symbol estimates. However, one practical issue on MLD in MIMO SM systems with AMC is MSC selection. LA is not straightforward in such systems. The error probability of each decoded codeword of SM does not have an analytic solution, and the effective post-processing SINR cannot be computed explicitly.

Physical Layer Abstraction for Interference Limited System

In LTE/LTE-A systems, system level evaluations are necessary to be performed before its deployment. Such evaluations normally require intensive computations with extremely long time because of the complexity of advanced receiver, the characterization of the radio links between each UE and eNodeB, and iterative regression simulation for all possible radio link scenarios. It is useful to have an accurate and effective physical layer abstraction model which replaces the actual link level computations and provides the higher layers with accurate link quality metrics. A physical link abstraction attempts to model the performance of the receiver based on the knowledge of the channel estimation of the desired and interfering signals, and information of the signal, interference and noise powers. A desirable output of the link abstraction is an effective instantaneous SINR, which is then used in characterization of SINR versus BLER to obtain an estimate of the BLER. The BLER is then mapped to appropriate CQI for LA. Calculation of the SINR for linear receivers such as MMSE and MMSE-Successive Interference Cancellation (MMSE-SIC) receivers is straightforward.

It is however difficult to arrive at good abstraction for non-linear receivers such as MLD, which is used widely in NAICS. For interference limited systems, LA is performed from reported CQI, assuming the UE's receiver has the Interference Cancellation (IC) capability. However, IC would sometimes be feasible and sometimes not, depending on the knowledge of interferer's information. This makes it difficult for UE to estimate the appropriate CQI, and for the eNodeB to select the appropriate MCS for the served UE. The link abstraction for NAICS is not established well due to statistical characteristics of interference from multiuser and multi-cell and complexity of dynamic wireless channel condition. However, the conventional mutual information based LA technique for noise limited system can be extended to the link abstraction modeling in performance evaluation of LTE/LTE-A interference limited systems with NAICS receivers.

Physical Layer Abstraction Based on Upper and Lower Bounds

In MIMO spatial multiplexing with MLD, choosing CQI for each spatial stream based on the SINR values is not straightforward because the effective post-processing SINR cannot be computed explicitly. The CQI might be calculated based on the estimates of pair-wise symbol error rate probability. The computing of the pair-wise probability would be computationally expensive since it requires a multi-dimensional symbol constellation search. In an appropriate modeling of the post-equalization SINR for each stream, the instantaneous SINR depends not only on the received interference powers from other stream, but also on the receiver's strategy. Generally, for the non-iterative MIMO receiver of SM system, the receiver uses MLD for spatial signal separation and performs joint detection for two streams of spatial multiplex. When the second interfering stream becomes more detectable by MLD, the post processing SINR of the first stream becomes larger. On the other hand, when the second interfering stream becomes less detectable, the post-processing SINR of the first stream becomes smaller. According to the above observation, the post-processing SINR for MLD is computed as the post-MMSE SINR plus gain factor, where the gain factor is adaptively chosen based on the detectability of interfering stream, which in turn depends on its instantaneous channel condition and modulation format of stream.

In some embodiments, the bound-based approach can be extended to the post-processing SINR estimation of interference limited systems in LTE/LTE-A with NACIS receivers, where the post-processing-subcarrier SINR is calculated based on the power allocation of the desired signal, MIMO channel matrix, precoding matrix, the corresponding parameters for each of the interferer's and thermal noise power, and Resource Block (RB) allocation. The link performance of MLD can be characterized by combining two receiver performance bounds: the linear MMSE receiver and genie-aided ML receiver. The performance gain of MLD over the MMSE receiver will be adaptive due to the increasing capability of interference cancellation.

Examples of NAICS Algorithms

The inter-cell interference issues in LTE/LTE-A are usually addressed by means of frequency domain inter-cell interference coordination schemes. Receiver-based solutions for the downlink interference-limited system have been specified in LTE-A Release 11. Interference Rejection Combining (IRC) effectively performs linear MMSE (LMMSE) filtering of the received signal to reduce the contribution of the interference in spatial domain. IRC achieves the best performance-complexity trade-off. However, under higher interference levels, a significant performance loss of the IRC compared to the Interference-Aware Receiver (IAR) can be observed. To achieve effective interference mitigation at the UE, an optimal simplified Interference-Aware Receiver (IAR) based on the ML criterion can be adopted. The basic idea is that the near interference-free performance could be achieved if the UE receiver is capable of decoding and subtracting the interfering data stream successively, e.g., inter-cell codeword cancellation. However, information about the interfering modulation and coding scheme and resource allocation is required, which is unavailable to the UE. An interference information estimator prior to the IAR can be implemented to overcome this problem of IAR.

Network assistance enabling the use of more advanced receivers including aggressive non-linear structures has achieved promising performance gains compared to Release 11-IRC under link-level simulation. NAICS, including Enhanced Linear-MMSE-IRC (E-LMMSE-IRC), SLIC, Code Word Interference Cancellation (CWIC), and R-ML receivers, proposed by 3GPP in Release 12, has the potential advantages of providing additional information to the UE in order to support its interference cancellation abilities. Performance enhancements to intra-cell and inter-cell interference mitigation at receiver are demonstrated by exploring the degree of interference knowledge with possible assistance from the network. Although the inter-cell CWIC can achieve the highest throughput among all schemes, it uses parameters, such as channel coding schemes, that can be very difficult to retrieve at UE side. SLIC has the best performance-complexity trade-off with reasonable parameter requirement for interference signal. In general, 3GPP uses SLIC detector as NAICS's baseline receiver for performance comparison.

Blind Interference Information Estimation

In contrast to the philosophy of interference suppression where the interference is directly suppressed and treated as background noise, there are two separate procedures for dealing with interference cancellation for NAICS receiver: interference extraction and interference reconstruction for received signals. With full knowledge of interference, link-level simulation showed that an advanced NAICS receiver with interference cancellation gives the significant performance improvements. However, different interference cancellation algorithms, based on different assumptions on the interferer's signal knowledge respectively, may use different network-assisted information. The key is to obtain an accurate estimate of the interfering signal, including the knowledge of its transmission structure (modulation scheme, transmission mode, and transmission power) and channel information before subtraction. Reliable estimation is of central important role in achieving promising performance.

Generally, the required parameters for an advanced receiver such as an SLIC include the number of antenna ports, channel estimation, modulation schemes, transmission mode, and PDSCH transmission power related to reference symbols, etc. Those parameters are not available at UE side. However, most of those parameters are to be blindly detected without or with network assistance. Blind estimation focuses on the correlation between the data sent and received without knowing the information of the exact transmitted data. It uses specified algorithms and a good amount of received samples to perform statistical analysis and regression. For example, the objective of blind modulation detection is to determine the type of modulation used with the received samples. The only empirical data provided by the received noisy samples is the distance to closest legitimate constellation point of all the used modulation schemes. Assuming all other parameters can be estimated reliably, the modulation scheme is detected with likelihood classification algorithms by calculating the differences of Euclidean distances between the received samples and all the legitimate constellation points of all possible modulation schemes. In addition, interferer's transmission mode for blind detection, including Rank Indicator (RI) and Precoding Matrix Indicator (PMI), is also a necessary stage at any time for NAICS application. Usually those parameters, including modulation scheme, RI, and PMI, could be detected jointly in one ML framework. The ML classifier minimizes the average probability of decision error for equally probable parameter combination. The ML classifier can be optimal, but the optimality comes with high computational complexity due to its implementation on each PRB and OFDM symbol in LTE systems. The key pre-processing step for blind detection is to cancel the desired signal from the received signal and generate the remaining signal for blind detection under the assumption that it includes other interference plus noise and small residual desired signal plus noise. Then modulation classification is performed for each of all possible RI and PMI combination.

The achievable performance of an NAICS, such as an SLIC, depends on the residual error after interference cancellation. The residual error depends on channel estimation accuracy of interfering cells and the parameter estimation quality of the interfering signals. When the blind detection is correct, the interference cancellation is accurate. The residual error should be small. Throughput near to interfering free could be achieved. When the detectors are incorrect, the interference cancellation will be incomplete. The residual error would be large. The performance of SLIC is not expected to give good result. E-LMMSE-IRC detection should be adaptive to get more robust performance result with less complexity. The performance of NAICS is affected by the combination of several parameters. There is no simple and monotonous relationship with any single parameter. In physical layer abstraction, post-SINR values depend on the quality of parameter estimation of interferer signal.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
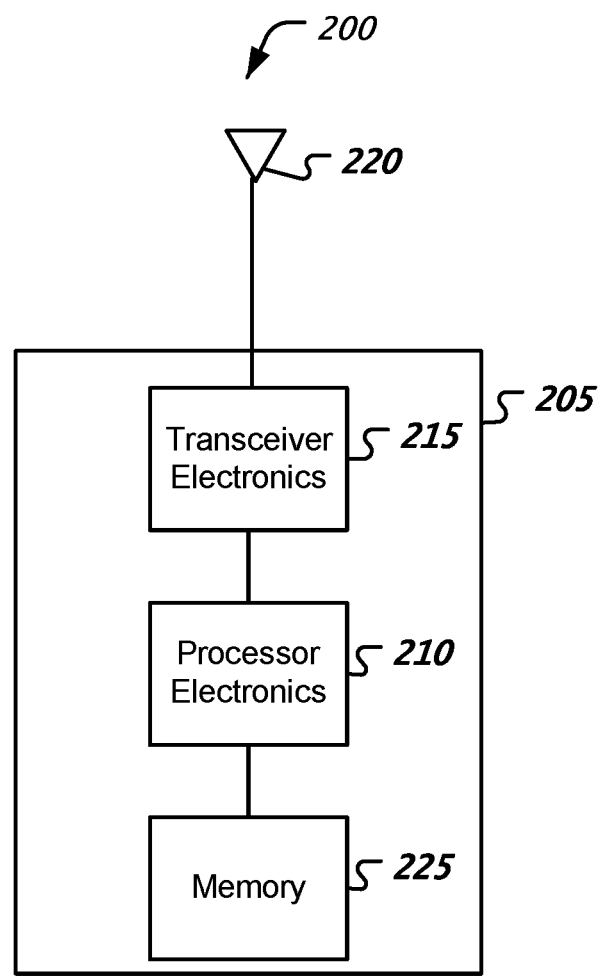
FIG. 2 shows an example of a wireless communication apparatus.

FIG. 2 shows an example of a radio transceiver station 200 for implementing a wireless device, a base station or other wireless communication modules. Various examples of radio stations include base stations and wireless devices in FIG. 2. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on an orthogonal frequency-division multiplexing (OFDM) air interface. In some implementations, radio stations 205 can communicate using one or more wireless technologies such as Wi-Fi, WiMAX, LTE, and LTE-A.

The disclosed techniques can be implemented on the radio station 205 and in the system depicted in FIG. 2.

Due to spectrum scarcity, most of LTE/LTE-A deployments currently reuse the same carrier frequency across neighboring cells. In addition, Multi-User MIMO can be highly spectral efficient by serving more than one user for the same time and frequency resource. In this context, most of the recent wireless communication systems are interference limited rather than noise limited. In LTE-A Release-12 enhancements, advanced receiver with interference cancellation capability is proposed to be used in LTE-A system at cell-edge to combat with strong multi-cell interferences and improve system capacity compared with Release 11 IRC. The performance gain is achieved by increasing the degree of interfering transmission knowledge from blind parameter estimation with possible network-assistance. In order to realize the actual performance improvements in LTE-A systems, it is essential to incorporate the performance gain from employing the NAICS receiver into adaptive transmission techniques such as LA. In some embodiments, LA is performed from reported CQI, which assumes the neighboring interference cancellation capability. Accuracy and reliable parameter estimation is of central importance in achieving interference cancellation effectively. For real-life deployed large-scale LTE network, channel condition and the number of interfering sources generated from the surrounding time synchronized and/or unsynchronized cells change dynamically with time. Data transmission of interfering cells with dynamic ON/OFF statistical characteristics highly depends on the dynamic scheduling behavior in neighboring cells. Therefore, interference cancellation of an NAICS receiver would sometimes be feasible and sometime not, depending on the achievable degree of interfering transmission knowledge from blind parameter estimation. It increases difficulty for UE to estimate instantaneous effective SINR and CQI for LA.

A physical link abstraction should attempt to model the performance of the receiver based on the knowledge of the desired and interfering signals and knowledge of the signal, interference, and noise powers. A desirable output of the abstraction is an effective SINR, which is then used in characterization of SINR versus BLER to obtain an instantaneous BLER. BLER could be converted to CQI for uplink report. Calculation of the SINR for linear receivers such as MMSE and MMSE-SIC receivers is straightforward. However, it is difficult to arrive at good abstraction for non-linear receivers such as MLD. For MIMO SM system, the post-processing SINR for MLD is computed as the post-MMSE SINR plus gain factor, where the gain factor is adaptively chosen based on the instantaneous channel condition and modulation format of interfering stream. The bound-based approach can be extended to the post-processing SINR estimation of interference limited systems in LTE/LTE-A with NACIS receivers. The link performance of NAICS can be estimated by combining two performance bounds: the linear LEMMSE-IRC receiver and genie-aided NAICS receiver. The performance gain of NAICS over the linear receiver will be adaptive due to the increasing capability of interference cancellation.

A physical layer abstraction method, which is based on the interference knowledge metrics from interferer's parameter blind detection, is useful in the adaptive gain factor estimation in the post-processing instantaneous SINR calculation for NAICS used in the LA of interference limited system. In some embodiments, the estimated post-processing SINR is equivalent to representing the achievable degree of interference cancellation. The complexity of link abstraction could be reduced and the precision of CQI estimation could be increased effectively. This adaptive approach can outperform the link abstraction models relying only on ISR based on the observations that the performance of NAICS is affected by a combination of several parameters, including but not limited to, SNR of serving cell, INR of strongest interferer, other residual interferers, modulation order, and transmission modes of both serving cell and interference cell. There are no simple and monotonous relationships with any single parameter. Some embodiments of the method use gain factor look-up tables of each parameter metrics for each set {Modulation Order, Transmission Mode (RI/PMI)} of downlink desired signal, along with the MIB mapping functions of interested modulation levels and AWGN reference curves of interested MCSs respectively.

In the present document, for simplicity of explanation, the neighbor interference model specified in 3GPP TR 36.388 is used, but the disclosed techniques can also be practiced in other situations.

Let the number of simultaneously transmitting cells be N, including the serving cell. The received signal is given by the superposition of all N cells, transmitted signals including the serving cell, $$y_k = \sum_{i=1}^{N} \sqrt{\beta_i}\, H_{ik} P_i x_{ik} + n_k \quad \text{Eq. (1)}$$

where $\beta_i$ is the traffic to pilot power ratio of the signal transmitted from $i^{th}$ cell, $H_{ik}$ is the channel matrix of the $i^{th}$ cell on $k^{th}$ Resource Element (RE), and $x_{ik}$ is the modulated symbol transmitted by the $i^{th}$ cell on the $k^{th}$ subcarrier and assumed to have a unit power in average. In addition, $k=0, 1, 2, \ldots, K-1$, $P_i$ is the spatial precoding matrix used by the $i^{th}$ cell. K is the total number of observed subcarriers. The number of cells is N with one serving cell and N-1 interferers, assuming that Cell 1 and 2 are the serving cell and dominant interfering cell respectively. UE attempts to cancel the data transmission on Cell 2. Signal processing algorithm attempts to extract transmission information structure of Cell 2 robustly.

Assuming that only the desired signal and one single dominate interferer is taken into account explicitly at the receiver, the received signal could be rewritten as $$y_k = \sqrt{\beta_1}\, H_{1k} P_1 x_{1k} + \sqrt{\beta_2}\, H_{2k} P_2 x_{2k} + \sum_{i=3}^{N} \sqrt{\beta_i}\, H_{ik} P_i x_{ik} + n_k \quad \text{Eq. (2)}$$

Without loss of generality, assuming that serving cell signals is stronger than the interfering cell signal, E-LMMSE-IRC is applied first to suppress interference signal and to estimate the desired serving cell signal. With the assumption of estimate channel estimation, $\widehat{H_{1k}}, \widehat{H_{2k}}$, traffic to pilot power ratio $\widehat{\beta_1}, \widehat{\beta_2}$ and modulated symbol $\widehat{x_{1k}}, \widehat{x_{2k}}$ per sub-carrier for serving cell and dominant interfering cell, $\widehat{P_1}, \widehat{P_2}$ spatial precoding matrix, respectively. The pre-processing received symbol could be used for dominant interfere information extraction after post cancellation for desired signal, $$\tilde{y}_k = \sqrt{\beta_2}\, H_{2k} P_2 x_{2k} + z_k \quad \text{Eq. (3)}$$

$$z_k = \sqrt{\beta_1}\, H_{1k} P_1 x_{1k} - \sqrt{\widehat{\beta_1}}\, \widehat{H_{1k}} \widehat{P_1} \widehat{x_{1k}} + \sum_{i=3}^{N} \sqrt{\beta_i}\, H_{ik} P_i x_{ik} + n_k \quad \text{Eq. (4)}$$

For simplicity, only one layer transmission is assumed for both target UE and interfering UE, but the disclosed techniques can also be practiced in other situations. The reliable channel estimation for both desired and interfering signals is available perfectly from reference symbols by channel estimation. The residual designed signal and all the other signals are treated as colored Gaussian and then whitened along with the background noise for interfering signal information detection. The granularity of detection is one PRB pair within each sub-frame.

After the whitening process, the interfering signal is the desired signal to be blindly detected. Several conventional detection algorithms could be applied to determine the dominant interferer. A more elaborate method is to calculate the difference between the received pre-processed signal and closest constellation point multiplied by channel estimate and the traffic to pilot power ratio of the signal. The jointly estimated mapped symbol, precoding matrix $\widehat{P_2}$ and the traffic to pilot power ratio of the signal $\widehat{x_{2k}}$ are the constellation point $\widehat{x_{2k}}$, that minimizes $$\min_{\widehat{x_{2k}}, \widehat{P_2}, \widehat{\beta_2}} \|\tilde{y}_k - \sqrt{\widehat{\beta_2}}\, \widehat{H_{2k}} \widehat{P_2} \widehat{x_{2k}}\|^2 \quad \text{Eq. (5)}$$

by taking hard decision. However, it is well known that the detection based on the minimum distance from the closet cancellation point to the approximate interference signal $\tilde{y}_k$ is not optimal.

Some embodiments use ML classification instead of minimum distance for blind detection. Modulation classification scheme based on the likelihood approaches minimizes the probability of classification error when the candidates are equally probable and show the optimal performance. It is done by comparing these mean values in different modulation modes. The ML algorithm degrades blind detection performance when SNR environment becomes worse. However, it could be improved if this method considers other metrics besides the minimum Euclidean distances.

During one transmission time interval, downlink physical layer parameters are the same on per PRB. Multi symbol average $N_b$ representing the number of sub-carriers should be used in blind detection to increase statistical accuracy.

In some embodiments, the transmission mode, including RI and PMI, could be blindly detected with the modulation scheme jointly with optimal performance.

Modulation scheme blind detection is a basic algorithm for other parameter detections. Assuming all other parameters are known, the likelihood-based algorithm computes mean values for grouped subcarriers and symbols. The average log-likelihood computation requires the knowledge of SNR, which is provided from channel estimation.

With blindly detected interference information, the basic implementation of an NAICS receiver is to make soft interference estimation of the symbols and then cancel the interference caused by these symbols to desired symbols.

For Rank 2 transmission mode, there are two codewords. They might have different modulation schemes. Two-layer blind detection could be implemented jointly with increasing complexity.

Blind detection provides the hard decision for modulation order, transmission mode (RI/PMI), as well as soft metrics $LLR_{mod}$, $LLR_{RI}$, $LLR_{PMI}$, that represent the reliability of blind detection.

The ML classifier maximizes the average probability of decision error for equally probable downlink scheduling event (combination of modulation order and transmission mode) at each PRB per TTI. The objective function to determine modulation order, RI and PMI jointly can be formulated as $$\text{Join} = \arg\max_{X \in c_n, P_2 \in \{R, PMI\}} \sum_{n_b=1}^{N_b} \ln\left\{\sum_{X \in C_n} \exp\left(-\frac{1}{\sigma^2}\left\|\tilde{y}_k - \sqrt{\beta_2}\,\bar{H}_{2k}\,\hat{P}_2\tilde{x}_{2k}\right\|^2\right)\right\} \quad \text{Eq. (6)}$$

where $C_n$ represents the known modulation constellation, $N_b$ represents the number of sub-carriers, R represents a rank for at least one of data, PMI represents the PMI set for the corresponding Rank and $\sigma^2$ is noise variance.

Let $e_k$ denote the residual error after soft dominant interference cancellation. The quality of cancelation is defined by a scalar variable, a, called the interference suppression factor, $$e_k = \sqrt{\beta_2}\,H_{2k}P_2x_{2k} - \sqrt{\beta}\,\bar{H}_2^-\,\hat{P}_2\bar{x}_{2k}^- \quad \text{Eq. (7)}$$

$$\alpha = \frac{\sum \text{Trace}(e_k e_k^H)}{\sum \text{Trace}\left(\sqrt{\beta_2}\,H_{2k}P_2x_{2k}\right)\left(\sqrt{\beta_2}\,H_{2k}P_2x_{2k}\right)^H} \quad \text{Eq. (8)}$$

The interference suppression factor is a random variable, depending on the quality of blind detection. When blind detection gives the reliable estimation for interferer's parameter, interference suppression factor should be a small quantity; otherwise it could be a larger value, even exceeding 1. It means that E-LMMSE-IRC detection should be adaptive to be selected to get more robust performance result with less complexity.

In some embodiments, the system level modeling methodology for NAICS receiver is carried out by two separate steps. The first step is to derive the post-processing SINR per subcarrier. After that, the simulator predicts the instantaneous BLER for each transmission block by a link quality model based on the input SINR. Post-processing SINR estimation model aims at accurately predicting the performance of LTE for the purpose of obtaining more accurate throughput results in system simulations. Appropriate modeling of the post-equalization SINR depends not only on the received interference powers, but also on the receiver structure. Correct modeling of the performance of the MIMO receiver and the interference between the several users being simultaneously transmitted is necessary if a meaningful validation of link level concepts at system level is expected. The post-processing SINR is strongly related to the decoding strategy used: it is determined by the minimum squared Euclidian distance associated with channel matrix. It is not straightforward to compute the post-processing SINR in the case of MIMO system using non-linear decoding algorithm such as MLD in NAICS. The post-MLD SINR is calculated as a function of the post-MMSE receiver SINR and the genie-aided interference (IF) receiver SINR.

In the conventional approach for noise limited system, referred in 3GPP TR 36.388, the received Mutual Information per transmit Bit (MIB) of receiver at Resource Element (RE) is based on a weighting between the MIBs at a lower-bound and an upper-bound SINR, $$\text{MIB}_{ML} = \beta \cdot f(\text{SINR}_L) + (1-\beta) \cdot f(\text{SINR}_U) \quad \text{Eq. (9)}$$

where the function of f(•) maps one SNR value to the corresponding MIB and one such function can be pre-derived numerically for all modulation schemes. After averaging $\text{MIB}_{ML}$ over multiple REs in the PDSCH, an effective SNR is then obtained as $$\text{SNR}_{\textit{eff}} = f^{-1}(\text{avg}(\text{MIB}_{ML})) \quad \text{Eq. (10)}$$

There are a few different ways to decide the lower- and upper bounds of SINR. Without loss of generality, the Alternated 1 in 36.866 is referred in this document.

The post-MLD SINR can be lower-bounded by post-MMSE receiver SINR:

$$\text{SNR}_L = \gamma_{k,v}^{MMSE} = \frac{1}{\sigma_{k,v}^2} - 1, \text{ for } v = 1, 2, \ldots, V_1 \quad \text{Eq. (11)}$$

where $\sigma_{k,v}^2$ denotes the mean-squared error (MSE), for the $v^{th}$ layer, given by $$\sigma_{k,v}^2 = \left[\left(I_{N_t} + \frac{1}{\sigma_n^2}\overline{H}_k^H \overline{H}_k\right)^{-1}\right]_{v,v} \quad \text{Eq. (12)}$$

where $\overline{H}_k = [H_k^1, H_k^2]$, $I_r$ denotes an identity matrix of size r, and $[\ ]_{v,v}$ represents the $n^{th}$ diagonal element of a matrix.

The post-MLD SINR can be upper-bounded by the genie-aided IF receiver and the corresponding SINR of the layer v can be represented as $$\text{SNR}_U = \gamma_{k,v}^{IF} = \frac{\|h_{k,v}^1\|}{\sigma_{k,v}^2} \text{ for } v = 1, 2, \ldots, V_1 \quad \text{Eq. (13)}$$

where $h_{k,v}^1$, indicates the $v^{th}$ column of $H_k^1$.

The conventional approach based on the fixed ratio β can lead to wrong layer separation in the strong interference case. Some adaptive approaches where the combining parameter is adaptively adjusted according to instantaneous interference-to-signal ratio (ISR) are also not optimal to characterize the NAICS receiver performance. Such adaptive approaches build up look-up tables to obtain for the weighting coefficient β as follows:

$$\beta(\text{ISR}_{k,v}) = \max\{\min\{(y_1-y_0)\cdot\text{ISR}_{k,v}+y_0, 1\}, \beta_{min}\} \quad \{\text{Eq. (14)}\}$$

where the interference-to-signal ration (ISR) is defined as:

$$\text{ISR}_{k,v} = 1 - \exp\left(-\frac{\|H_{k,v}^{2,\textit{eff}}\|_F}{\|h_{k,v}^1\|}\right) \text{ with} \quad \text{Eq. (15)}$$

$$H_{k,v}^{2,\textit{eff}} = [\{h_{k,l}^1\}_{l \neq v}\, H_k^2] \quad \text{Eq. (16)}$$

Link abstraction model parameters, $y_0$, $y_1$, and $\beta_{min}$ are for optimization by using tuning procedure.

For the interference channel under very strong interference, the information of interference could be recovered reliably, under strong interference, at the same rate that is achievable in the absence of interference. This implies that for the conventional static approach to work properly, the lower bound $\gamma_{k,v}^{MMSE}$ should converge to the upper bound $\gamma_{k,v}^{IF}$ in the strong interference region, in other words, the lower bound is a function of ISR.

As mentioned herein, the basic idea of an NAICS receiver is to make soft estimation of the interference symbols from received signal and then cancel the interference caused by these symbols to other symbols on the desired signal. Achievable performance gain of such IC receiver depends heavily on the reliability of soft interference estimation from blind parameter detection. For poor soft symbol estimation due to weak interference, IC might not be applicable, and only IRC is feasible even the performance loss due to interference could be considerable. In general, blind detection performance is affected by a combination of several parameters, including SNR of serving cell, INR of the strongest interferer, other residual interferers, and modulation order and transmission modes of both serving cell and interference cell. There is no simple and monotonous relationship with any single parameter. The instantaneous SINR gain factor adaptively computed based on ISR only is not optimal to characterize the NAICS receiver performance.

The following Blind Detection (BD)-adaptive parameterization of $\beta_{BD}$ is disclosed, which is a function of blind detection metrics.

$$\beta_{BD} = f(LLR_{mod}, LLR_{RI}, LLR_{PMI}) \quad \text{Eq. (17)}$$

where $LLR_{mod}$, $LLR_{RI}$, $LLR_{PMI}$ are soft metrics from blind detection for modulation scheme, RI, and PMI respectively. Metrics represents the reliability of parameter blind detection. However the optimal function or relationship depends on the detailed receiver algorithm and cancellation strategy due to different sensitivity to the detection errors of interference signal. For SLIC, the simple and linear combination could be applied with the assumption that the detection error impacts of those parameters are independence approximately, $$\beta_{BD} = \alpha_{mod} \cdot f_1(LLR_{mod}) + \alpha_{RI} \cdot f_2(LLR_{RI}) + \alpha_{PMI} \cdot f_3(LLR_{PMI}) \quad \text{Eq. (18)}$$

The gain factor is a function of blind detection metrics for modulation order, RI and PMI, separately. Those soft metrics could be calculated individually with ML algorithm formulated by assuming that all other parameters are known. Lookup tables of gain factor for different transmission modes and modulation schemes of desire signal can be pro-calculated. Empirical parameters in mapping function could be tuned carefully with link-level simulation.

In some embodiments, at least three blind detection metrics are used for the tables for each of modulation schemes and transmission modes along with the MIB mapping functions of interested modulation levels and AWGN reference curves of interested MCSs respectively. The mode parameters, $\alpha_{mod}$, $\alpha_{RI}$, $\alpha_{PMI}$, $f_{mod}$, $f_{RI}$, $f_{PMI}$, can be tuned by training the link abstraction model, which should include the non-linear mapping and the effect of non-Gaussian interference. The remaining steps for SINR to MIB, and MIB to CQI mapping, are the same as standard approach in most research works. The training allows the link abstraction model to have the best model parameters for minimizing the error between the estimated BLER and the actual BLER obtained from link-level simulations.

Figure 3:
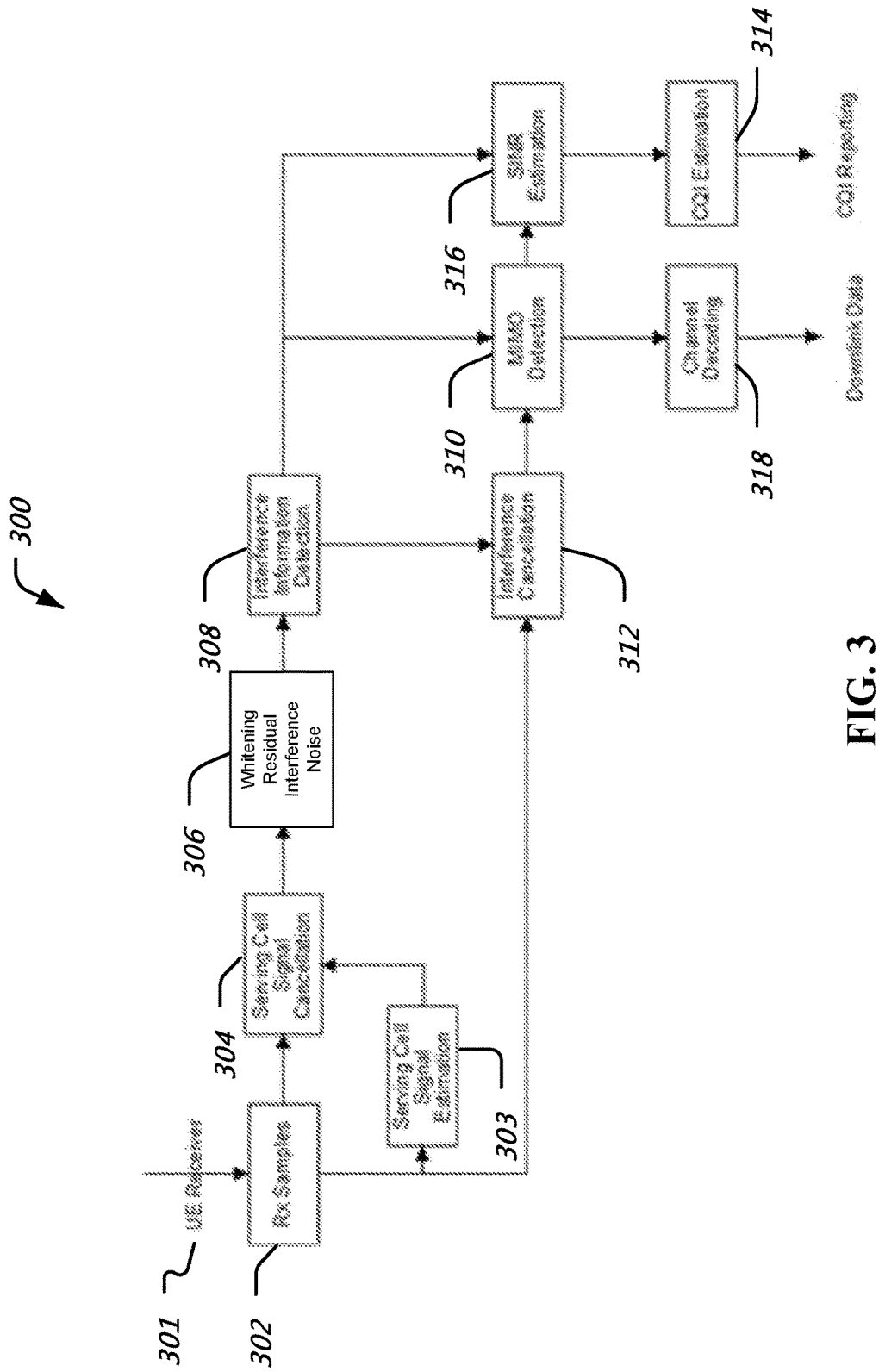
FIG. 3 is a block diagram showing an example of a wireless receiver apparatus.
Figure 4:
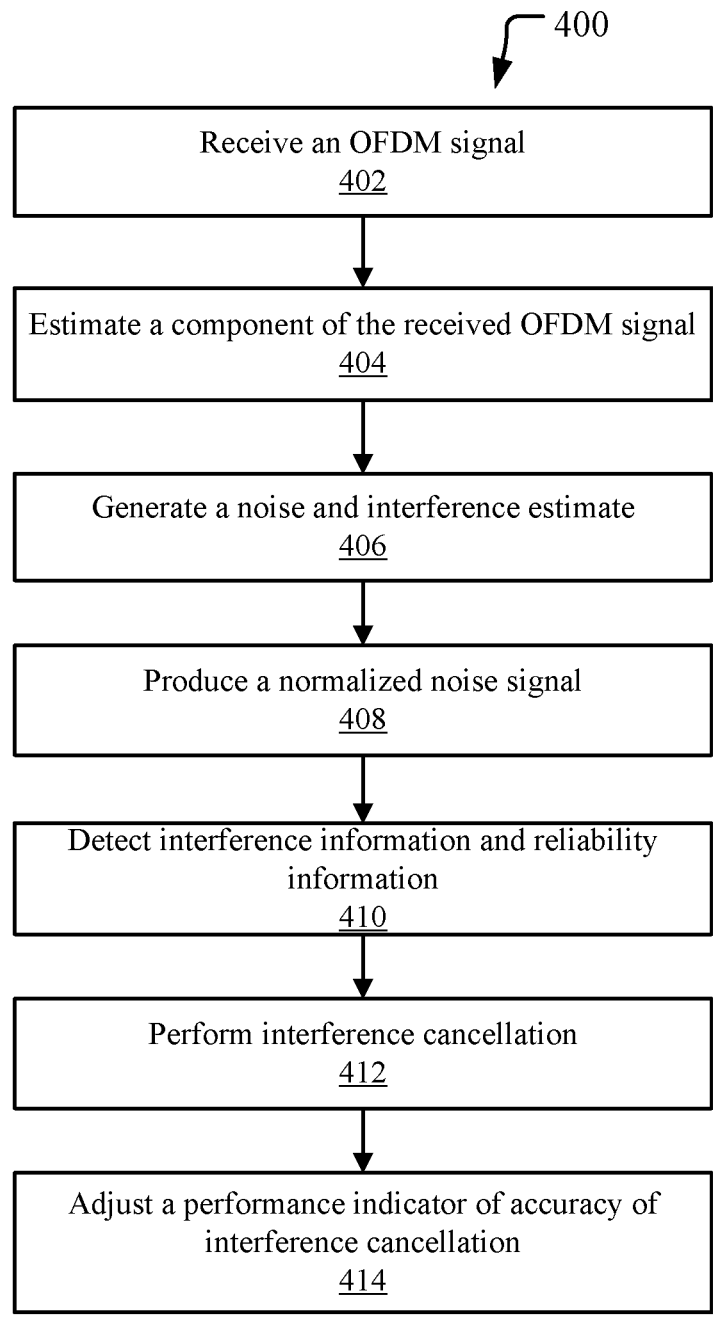
FIG. 4 shows a flowchart of an example method of wireless communications.

FIG. 3 shows an example block diagram of a portion of a wireless signal receiver apparatus 300, in which some of the blind detection for interference information and SINR estimation techniques disclosed in this document can be used for processing received wireless signals. The receiver apparatus 300 may be embodied in the wireless receivers 110 or the receiver 200 as described herein. In the apparatus 300, signals are received by a UE receiver 301 and are converted to a stream of samples 302. The received samples may correspond to each RE, and may include contribution from signals of the serving cell and all interfering cell signals. The serving cell signal is estimated by a module 303 using a signal estimation algorithm, e.g., with E-MMSE-IRC, using the availability of channel estimation for serving and interfering cells. The module 304 then cancels the serving-cell signal from the received samples, outputting residual samples whose main contribution may be from a dominant interfering cell signal. A FIG. 4 shows an example flowchart of a method 400 of operating a wireless communication receiver. The method 400 may be implemented, e.g., on the radio station 205 and in the system depicted in FIG. 2.

The method 400 includes, at 402, receiving, by a wireless receiver, an orthogonal frequency division multiplexing (OFDM) signal. For example, this signal may be an LTE compliant signal, because LTE specifies signal transmissions using OFDM. Other embodiments may receive other OFDM signals such as WiMAX or Wi-Fi compliant signals. The OFDM signal may be characterized by a transmission time interval, and wherein the non-linear time-domain filtering is performed in the frequency-domain filtered signal and a delayed version of the frequency-domain filtered signal delayed by an integer number of transmission time interval values. The transmission time interval represents a logical time period, within which resources are allocated for various transmissions.

The method 400 includes, at 404, estimating, a component of the received OFDM signal corresponding to a serving cell transmission. In some embodiments, an IRC algorithm may be used at 404, e.g., an IRC algorithm specified in the 3GPP LTE specifications.

The method 400 includes, at 406, generating a noise and interference estimate by subtracting the component from the received OFDM signal. For example, as described with respect to module 304, the estimate may be generated by subtracting serving cell signal estimates from received sample values.

The method 400 includes, at 408, producing a normalized noise signal by whitening the noise and interference estimate.

The method 400 includes, at 410, detecting interference information from the normalized noise signal and associating, with the interference information, corresponding reliability information indicating reliability of the interference information. In some embodiments, a blind detection algorithm is used for the detection and corresponding metrics representing reliability of the blind detection are generated based on modulation schemes and transmission modes of the receiver.

The method 400 includes, at 412, performing interference cancellation based on the interference information. Interference cancellation may be implemented in an advanced network assisted interference cancellation suppression (NAICS) receiver, e.g., as specified in LTE-Advanced Release 12.

The method 400 includes, at 414, adaptively adjusting a performance indicator indicative of an accuracy of the interference cancellation using the reliability information. In some embodiments, the performance indicator comprises a SINR gain factor and adjusting of the SINR gain factor comprises constructing a linear combination of the plurality of metrics. The SINR gain factor can also be pre-calculated and stored in a lookup table.

In some embodiments, the method 400 may further include generating the reliability information based on modulation schemes and transmission modes of the receiver.

This may be achieved by generating at least three metrics as the reliability information for each of the modulation schemes and the transmission modes.

In some embodiments, the method 400 may further include pre-calculating and pre-storing the SINR gain factor in a lookup table. In some embodiments, the SINR gain factor is used in SINR calculation for the MLD. In some embodiments, the SINR calculation may be further decided by a lower bound and an upper bound of SINR values.

Figure 5:
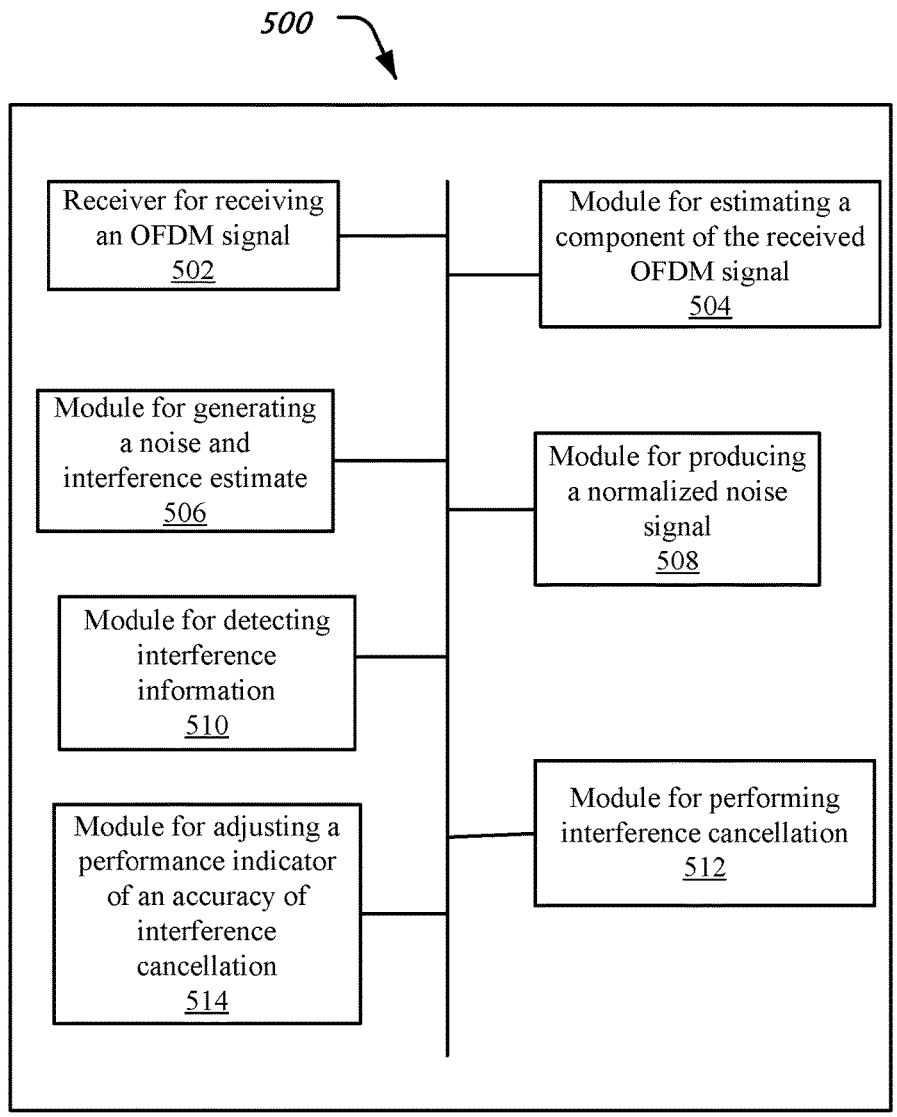
FIG. 5 shows a block diagram example of a wireless communication apparatus.

FIG. 5 shows an example block diagram of a portion of a wireless signal receiver apparatus 500. The apparatus 500 includes a module 502, for receiving, by a wireless receiver, an orthogonal frequency division multiplexing (OFDM) signal.

The apparatus 500 includes a module 504, estimating, a component of the received OFDM signal corresponding to a serving cell transmission. For example, an IRC algorithm specified in LTE specifications may be used for the estimation.

The apparatus 500 includes a module 506, generating a noise and interference estimate by subtracting the component from the received OFDM signal. For example, as described with respect to module 304, the estimate may be generated by subtracting serving cell signal estimates from received sample values.

The apparatus 500 includes a module 508, producing a normalized noise signal by whitening the noise and interference estimate.

The apparatus 500 includes a module 510, detecting interference information from the normalized noise signal and associating, with the interference information, corresponding reliability information indicating reliability of the interference information. In some embodiments, a blind detection algorithm is used for the detection and metrics are generated based on modulation schemes and transmission modes of the receiver.

The apparatus 500 includes a module 512, performing interference cancellation based on the interference information. Interference cancellation may be implemented on an advanced network assisted interference cancellation suppression (NAICS) receiver, e.g., as specified in LTE-Advanced Release 12.

The apparatus 500 includes a module 514, adaptively adjusting a performance indicator indicative of an accuracy of the interference cancellation using the reliability information. In some embodiments, the performance indicator comprises a SINR gain factor and adjusting of the SINR gain factor comprises constructing a linear combination of the plurality of metrics. The SINR gain factor can also be pre-calculated and stored in a lookup table.

It will be appreciated by one of ordinary skill in the art that techniques for processing received wireless signals using network-assisted interference cancellation to mitigate undesirable loss of performance of interference are disclosed.

It will further be appreciated that, in one aspect, a physical layer abstract method, relying on the blind detection reliability metrics of interfering signal, for system level simulation in a wireless communication system with multi-intercell interferences at cell-edge, especially for the blind interference information extraction of advanced network assisted interference cancellation suppression (NAICS) receiver, e.g., as specified in LTE-Advanced Release 12, is disclosed.

The disclosed and other embodiments, modules and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of wireless signal processing performed at a receiver in a wireless cellular communication network, comprising:
    receiving, by a wireless receiver, an orthogonal frequency division multiplexing (OFDM) signal;
    estimating, a component of the received OFDM signal corresponding to a serving cell transmission;
    generating a noise and interference estimate by subtracting the component from the received OFDM signal;
    producing a normalized noise signal by whitening the noise and interference estimate;
    detecting interference information from the normalized noise signal and associating, with the interference information, corresponding reliability information indicating reliability of the interference information;
    performing interference cancellation based on the interference information; and
    adaptively adjusting a performance indicator indicative of an accuracy of the interference cancellation using the reliability information.

2. The method of claim 1, wherein the detecting of interference information comprises using a blind detection algorithm.

3. The method of claim 2, wherein the blind detection algorithm uses Maximum Likelihood (ML) classification.

4. The method of claim 1, further including:
    generating the reliability information based on modulation schemes and transmission modes of the receiver.

5. The method of claim 4, further including:
    generating at least three metrics as the reliability information for each of the modulation schemes and the transmission modes.

6. The method of claim 1, wherein the performance indicator comprises an SINR gain factor.

7. The method of claim 6, further including:
    pre-calculating and pre-storing the SINR gain factor in a lookup table.

8. The method of claim 6, wherein the SINR gain factor is used in SINR calculation for a Maximum Likelihood Detector (MLD).

9. The method of claim 8, wherein the SINR calculation for the MLD is further decided by a lower bound and an upper bound of SINR values.

10. The method of claim 1, further comprising:
    reporting Channel Quality Information (CQI) based on the performance indicator, and
    performing Link Adaptation (LA) based on the reporting of CQI.

11. A wireless receiver apparatus, comprising:
    a receiver circuit that receives an orthogonal frequency division multiplexing (OFDM) signal; and
    a processor that processes the received OFDM signal by:
        estimating, a component of the received OFDM signal corresponding to a serving cell transmission;
        generating a noise and interference estimate by subtracting the component from the received OFDM signal;
        producing a normalized noise signal by whitening the noise and interference estimate;
        detecting interference information from the normalized noise signal and associating, with the interference information, corresponding reliability information indicating reliability of the interference information;
        performing interference cancellation based on the interference information; and
        adaptively adjusting a performance indicator indicative of an accuracy of the interference cancellation using the reliability information.

12. The apparatus of claim 11, wherein the detecting of interference information comprises using a blind detection algorithm.

13. The apparatus of claim 12, wherein the blind detection algorithm uses Maximum Likelihood (ML) classification.

14. The apparatus of claim 11, wherein the reliability information is generated based on modulation schemes and transmission modes of the receiver.

15. The apparatus of claim 14, wherein at least three metrics are generated as the reliability information for each of the modulation schemes and the transmission modes.

16. The apparatus of claim 11, wherein the performance indicator comprises a SINR gain factor.

17. The apparatus of claim 16, wherein the SINR gain factor is pre-calculated and stored in a lookup table.

18. The apparatus of claim 16, wherein the SINR gain factor is used in SINR calculation for Maximum Likelihood Detector (MLD).

19. The apparatus of claim 18, wherein the SINR calculation for MLD is further decided by a lower bound and an upper bound of SINR values.

20. The apparatus of claim 19, wherein the processor is further configured to process the received OFDM signal by:
    reporting Channel Quality Information (CQI) based on the performance indicator, and
    performing Link Adaptation (LA) based on the reporting of CQI.

21. A non-transitory computer-readable program medium storing computer-executable instructions, which when executed by a processor, causing the processor to implement a method comprising:
    receiving, by a wireless receiver, an orthogonal frequency division multiplexing (OFDM) signal;

estimating, a component of the received OFDM signal corresponding to a serving cell transmission;

generating a noise and interference estimate by subtracting the component from the received OFDM signal;

producing a normalized noise signal by whitening the noise and interference estimate;

detecting interference information from the normalized noise signal and associating, with the interference information, corresponding reliability information indicating reliability of the interference information;

performing interference cancellation based on the interference information; and adaptively adjusting a performance indicator indicative of an accuracy of the interference cancellation using the reliability information.

22. The non-transitory computer-readable program medium of claim 21, wherein the detecting of interference information comprises using a blind detection algorithm.

23. The non-transitory computer-readable program medium of claim 22, wherein the blind detection algorithm uses Maximum Likelihood (ML) classification.

24. The non-transitory computer-readable program medium of claim 21, wherein the method further comprises:
generating the reliability information based on modulation schemes and transmission modes of the receiver.

25. The non-transitory computer-readable program medium of claim 24, wherein the method further comprises:
generating at least three metrics as the reliability information for each of the modulation schemes and the transmission modes.

26. The non-transitory computer-readable program medium of claim 21, wherein the performance indicator comprises an SINR gain factor.

27. The non-transitory computer-readable program medium of claim 26, wherein the method further comprises:
pre-calculating and pre-storing the SINR gain factor in a lookup table.

28. The non-transitory computer-readable program medium of claim 26, wherein the SINR gain factor is used in SINR calculation for a Maximum Likelihood Detector (MLD).

29. The non-transitory computer-readable program medium of claim 28, wherein the SINR calculation for the MLD is further decided by a lower bound and an upper bound of SINR values.

30. The non-transitory computer-readable program medium of claim 21, wherein the method further comprises:
reporting Channel Quality Information (CQI) based on the performance indicator, and
performing Link Adaptation (LA) based on the reporting of CQI.

\* \* \* \* \*